(12) United States Patent
Springer et al.

(10) Patent No.: US 11,409,975 B2
(45) Date of Patent: Aug. 9, 2022

(54) PASSIVE NEAR FIELD COMMUNICATION (NFC) DEVICE, METHOD AND SYSTEM

(71) Applicant: EM Microelectronic-Marin SA, Marin (CH)

(72) Inventors: James J. Springer, Colorado Springs, CO (US); Fabrice Walter, Hyeres (FR); Pierre Muller, Marin (CH); Fabien Bourquin, Concise (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 17/269,552

(22) PCT Filed: Aug. 22, 2019

(86) PCT No.: PCT/EP2019/072525
§ 371 (c)(1),
(2) Date: Feb. 19, 2021

(87) PCT Pub. No.: WO2020/039048
PCT Pub. Date: Feb. 27, 2020

(65) Prior Publication Data
US 2021/0342557 A1 Nov. 4, 2021

Related U.S. Application Data

(60) Provisional application No. 62/721,318, filed on Aug. 22, 2018.

(30) Foreign Application Priority Data

Oct. 29, 2018 (EP) .................................. 18203145

(51) Int. Cl.
*H04B 5/02* (2006.01)
*H04W 4/80* (2018.01)
(Continued)

(52) U.S. Cl.
CPC ....... *G06K 7/10297* (2013.01); *H04B 5/0031* (2013.01); *H04B 5/0056* (2013.01); *H04B 5/02* (2013.01); *H04W 4/80* (2018.02)

(58) Field of Classification Search
CPC .................................................. G06K 7/10297
See application file for complete search history.

(56) References Cited

U.S. PATENT DOCUMENTS

| 2013/0260684 A1* | 10/2013 | Suzuki | H04W 76/30 455/41.1 |
| 2013/0317924 A1* | 11/2013 | Bush | H04W 4/80 705/16 |
| 2014/0256251 A1* | 9/2014 | Caceres | H04W 12/084 455/41.1 |

FOREIGN PATENT DOCUMENTS

| EP | 2 701 414 A1 | 2/2014 | |
| EP | 2701414 A1 * | 2/2014 | ............. H04W 8/26 |

OTHER PUBLICATIONS

International Search Report dated Sep. 20, 2019 in PCT/EP2019/072525 filed Aug. 22, 2019.

* cited by examiner

*Primary Examiner* — Joseph H Feild
*Assistant Examiner* — Pameshanand Mahase
(74) *Attorney, Agent, or Firm* — Oblon, McClelland, Maier & Neustadt, L.L.P.

(57) ABSTRACT

The present disclosure relates to a NFC communication system, to a method of establishing communication between a wireless communication device and a passive NFC device and to a passive NFC device. The passive NFC device includes an NFC controller, an NFC transceiver coupled with the NFC controller, and at least one persistent flag coupled with the NFC controller, the persistent flag being switchable between an activated state and a deactivated (Continued)

state. The NFC controller is configured to perform a logical operation being divisible into a sequence of at least a first subtask and a second subtask and the NFC controller is configured to ascertain the status of the persistent flag. The NFC controller is further configured to selectively perform at least one of the first subtask and the second subtask on the basis of the status of the persistent flag.

16 Claims, 4 Drawing Sheets (51) Int. Cl.
    *G06K 19/073*      (2006.01)
    *G06K 7/10*      (2006.01)
    *H04B 5/00*      (2006.01)

PASSIVE NEAR FIELD COMMUNICATION (NFC) DEVICE, METHOD AND SYSTEM

TECHNICAL FIELD

The present disclosure relates to the field of passive near field communication (NFC) devices and systems as well as to a method of establishing communication between a wireless communication device and a passive NFC device.

BACKGROUND

Mobile communication systems continue to grow in popularity and have become an integral part of both personal and business communications. Various mobile devices now incorporate smartphones, tablet computers, smartwatches, Personal Digital Assistant (PDA) features such as calendars, address books, task lists, calculators, memo and writing programs, media players, games, etc. These multifunction devices usually allow electronic mail (email) messages to be sent and received wirelessly, as well as access the internet via a cellular network and/or a wireless local area network (WLAN), for example. Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communication devices. This short-range high frequency wireless communication technology exchanges data between devices over a short distance, such as only a few centimeters.

The use of mobile devices to interact with NFC device, in particular with passively powered NFC tags is nowadays ubiquitous in society. There are different ways for a mobile communication device to interact with tags but the preferred manner is to avoid the use of a dedicated App to interact with the NFC tag. The primary purpose of the tag is to provide a NFC Data Exchange Format (NDEF) message that directs the wireless communication device to use its web browser and go to Uniform Resource Locator (URL) specified by the NDEF message.

The use of the concept above is now expanding to perform web based authentication of the tag or an object attached to the tag. This type of authentication requires the use of a dynamic NDEF message using a value that is known to change in a predictable manner. For example, it could be the use of a counter that is known to increase each time the NDEF message is sent to the wireless communication device, which could be a mobile device. Consequently, there is a need to autonomously update the counter value in persistent memory (a.k.a. non-volatile memory). The counter value must be updated after tag power up and prior to the initial tag communication with the wireless communication device.

Currently, NFC Forum Type 5 tags use the ISO/IEC 15693 protocol and cannot support web based authentication whereas NFC Forum Type 2 tags use the ISO/IEC 14443 protocol and can support web based authentication. The difference is that the two protocols have different timing requirements for the minimum field on time before the mobile device can initiate a communication with a tag. This is the only time period during which a tag can autonomously update its value in non-volatile memory and prepare the dynamic NDEF message. The power up time permitted for the ISO/IEC 15693 protocol is too short to update a value in the most commonly used type of non-volatile memories.

It is therefore desirable to provide an improved near field communication device, an improved NFC communication system and a method of establishing communication between a wireless communication device and an NFC device that overcomes the shortcomings of the prior art. It is of particular interest to provide an NFC device operating on the basis of the NFC forum type 5 tag, which is configured to communicate with a wireless communication device on the basis of this communication protocol and which at the same time is enabled to support web-based authentication.

SUMMARY

One aspect relates to a method of establishing communication between a wireless communication device and a passive near field communication device. Typically, the method relates to the establishing of a communication link between a wireless communication device and a passive near field communication device, wherein the passive near field communication device comprises a near field communication controller, a near field communication transceiver coupled with the near field communication controller, at least one persistent flag coupled with the near field communication controller, the at least one persistent flag being switchable between an activated state and a deactivated state. The method includes:

transmitting at least one polling request from the wireless communication device to the passive near field communication device, the at least one polling request being relative to a logical operation to complete by the near field communication controller, and performing the logical operation by the near field communication controller in function of the activated or deactivated state of the at least one persistent flag during a state of timeout of the passive wireless communication device succeeding to each polling request.

In other embodiments:

the step of performing comprises a sub-step of splitting the logical operation into a sequence of at least a first subtask and a second subtask;

the step of performing comprises a sub-step of selectively performing by the near field communication controller at least one of the first subtask and the second subtask on the basis of the status of at least one persistent flag;

the sub-step of selectively performing comprises an ascertaining phase by the near field communication controller the status of at least one persistent flag;

the sub-step of selectively performing comprises a performing phase of the first subtask when the at least one persistent flag is deactivated;

the sub-step of selectively performing comprises a performing phase of the second subtask when the at least one persistent flag is activated;

the sub-step of selectively performing comprises a switching phase of at least one persistent flag from the deactivated state into the activated state after completion of the first subtask;

the sub-step of selectively performing comprises a switching phase of at least one persistent flag from the activated state into the deactivated state after completion of the second subtask;

the at least one persistent flag is implemented as a persistent flag configured to maintain the activated state for at least a predetermined flag time;

the communication between the wireless communication device and the passive near field communication device is realized:

on the basis of a first communication protocol defining a first state of timeout, or on the basis of a first communication protocol and on the basis of a second communication protocol defining a second state of timeout, wherein the second state of timeout is larger than the first state of timeout; and the first state of timeout is shorter than a total operation time required by the near field communication controller to perform the logical operation.

In this context, the state of timeout otherwise called "timeout" is referring here to the end of a delay allowed for a specific task or action to finish, whether this delay is defined by specification or system consideration. The timeout implementation might be implicit in the sense that it is necessary to respect this delay for the system to work.

In this method, at least one persistent flag is switchable between an activated state and a deactivated state. Optionally, the passive NFC device comprises at least one or numerous further persistent flags, e.g. a second, a third, a fourth or even up to n persistent flags each being coupled with the NFC controller and each being switchable between an activated state and a deactivated state.

In other words, the method comprises the step of transmitting a polling request from the wireless communication device to the passive NFC device. The method further comprises the step of performing a logical operation by the NFC controller by and through dividing the logical operation into a sequence of at least a first sub-task and a second sub-task. Optionally, the logical operation is performed and conducted by the NFC controller by dividing the logical operation into numerous sub-tasks, e.g. a first, a second, a third, . . . , nth sub-task.

The method further comprises the step of ascertaining the status of at least one persistent flag. Optionally and if they are provided numerous further persistent flags the method also ascertains the status of such further persistent flags.

Thereafter and having ascertained the status of the persistent flag the method continues to selectively perform at least one of the first sub-task and the second sub-task on the basis of the status of the persistent flag. In cases where numerous further persistent flags, e.g. a second, a third, a fourth or even up to n persistent flags are present at least one of the associated sub-tasks is selected for execution and is selectively performed depending on the status of the numerous persistent flags.

Typically, there is only one sub-task performed at a time. The state of the numerous persistent flags is indicative of only one of the sub-tasks of the numerous sub-tasks to be selectively performed by the method.

Typically, each one of the numerous persistent flags can be mapped or associated to at least one of the numerous sub-tasks.

According to another example the method comprises the step of switching the persistent flag from the deactivated state into the activated state after completion of the first sub-task and/or after switching at least one persistent flag from the deactivated state into the activated state after completion of the second sub-task. In a typical application scenario the second sub-task is switched back from the activated state into the deactivated state after a communication link between the wireless communication device and the near field communication device has been set up and/or after the communication between the wireless communication device and the passive NFC device has terminated.

Here, the second sub-task represents the last sub-task of the sequence of sub-tasks of the logical operation. If the logical operation is split into a number of n sub-tasks the n−1th persistent flag is configured to be switched from the deactivated state into the activated state after completion of the nth sub-task. It can be noticed that there is in general need for n−1 flags if there are n subtasks. At the completion of the nth subtask, the device just continue with establishing the communication. Thereafter and as a final step the communication link between the wireless communication device and the passive NFC device is established. After termination of the communication between the wireless communication device and the passive NFC device the last and hence the n−1th persistent flag may be switched into the deactivated state.

It is further to be noted, that the method of establishing communication between the wireless communication device and the near field communication device is particularly dedicated to establish a communication link between the passive NFC device as described above and the wireless communication device as described above. Insofar any features, effects and benefits described above in connection with the passive NFC device and the wireless communication device equally apply to the method of establishing communication between the wireless communication device and the passive NFC device; and vice versa.

According to another the disclosure further relates to a passive near field communication (NFC) device. The passive NFC device comprises an NFC controller and an NFC transceiver coupled with the NFC controller. The passive NFC device further comprises at last one persistent flag coupled with the NFC controller. The at least one persistent flag is switchable between an activated state and a deactivated state.

The passive near field communication device also comprises a non-volatile memory comprising at least one memory block and wherein the first subtask comprises erasing of at least one memory block and wherein the second subtask comprises writing of at least one memory block.

In this passive NFC device, the NFC controller is further configured to perform a logical operation. The logical operation being divisible into a sequence of at least a first sub-task and a second sub-task. The second sub-task is to be performed after completion of the first sub-task. Insofar, the logical operation is divisible into a temporal sequence of numerous sub-tasks that are to be performed according to a temporal sequence, i.e. one after the other.

The NFC controller is further configured to ascertain the status of at least one persistent flag. Furthermore, the NFC controller is configured to selectively perform at least one of the sub-task and the second sub-task on the basis of the status of at least one persistent flag. The status of at least one persistent flag determines which one of the first and second sub-tasks has to be performed at a given time.

In this way, the passive NFC device, which may be implemented as a passive NFC device becomes enabled to divide a logical operation into numerous sub-tasks, each of which requiring less time for their performance compared to the overall logical operation. After at least one of the sub-tasks has been performed, a respective persistent flag being indicative of the performance of this particular sub-task is activated, set or asserted. In the event, that the amount of electrical energy of passive NFC device resulting from energy harvesting is not sufficient before the overall logical operation has been performed the numerous tags will be indicative upon a subsequent power up of the passive NFC device which one of the sub-tasks have been performed and at which step, hence at which subsequent sub-task the NFC controller should resume the performance of the logical operation when the passive NFC device is powered up again.

Moreover, if the performance of an overall logical operation requires a performance time being too large for a given communication protocol of a wireless communication device, the logical operation can be split into the sequence of at least a first and a second or even more sub-tasks that are to be performed one after the other.

Given that the passive NFC device is configured to establish wireless communication with a wireless communication device on the basis of a first communication protocol, which first communication protocol defines a first state of timeout and which first state of timeout being shorter than the overall time required by the passive NFC device to perform the overall logical operation. The passive NFC device may be now configured to split the logical operation into numerous sub-tasks, wherein at least one or several sub-tasks are performed during the state of timeout of a polling request. The passive NFC device may not be able to react appropriately to a polling request but the passive NFC device may be configured to react appropriately to a subsequent polling request of the wireless communication device.

In an example the NFC is configured to communicate with the wireless communication device on the basis of a first communication protocol and is further configured to perform the logical operation in response to a second polling request of the wireless communication device, wherein the second polling request is based on a second communication protocol that is different to the first communication protocol and wherein the second communication protocol comprises or defines a second state of timeout that is larger than the first state of timeout. Moreover and according to another example the second state of timeout is larger than the time required for the NFC controller to perform the logical operation.

According to an example the NFC controller is configured to perform the first sub-task when the persistent flag is deactivated or when the persistent flag is deasserted. In particular, the NFC controller is configured to perform the first sub-task only when the persistent flag is deactivated. If the persistent flag is activated or asserted then the NFC controller is inhibited to perform the first sub-task. In this case, the NFC controller may be configured to skip the first sub-task and continue directly with a subsequent sub-task, e.g. with the second sub-task. In this way and when the persistent flag is activated the NFC controller does not perform the first sub-task. Computational time and hence the total time to perform the overall logical operation can be saved. This is of particular use, when the completion of the logical operation is prematurely interrupted, e.g. due to a loss of power.

According to another example the NFC controller is configured to perform the second sub-task when the persistent flag is activated. In particular, the NFC controller is configured to perform the second sub-task only when the persistent flag is activated. In this way and as long as the persistent flag is deactivated the NFC controller is configured to perform the first sub-task. As long as the persistent flag is activated the NFC controller is hindered to perform the first sub-task but is configured to perform the second sub-task instead.

Depending on the status of one persistent flag the controller either performs the first sub-task or the second sub-task.

In this way and during a first phase of a temporary power up of the passive NFC device the NFC controller may be configured to perform and to complete the first sub-task and to set the persistent flag into the activated state. During a second, hence subsequent power up, the performance of the logical operation is resumed with the second sub-task while the first sub-task is skipped.

According to a further example the NFC controller is configured to switch from the deactivated state into the activated state after or upon completion of the first sub-task. In this way, the persistent flag identifies the intermediate status of the performance of the overall logical operation. If for instance the power should be lost after the first sub-task has been performed and if the passive NFC device is powered up again within a predefined time interval, the NFC controller is configured to ascertain the status of the persistent flag and to start or to continue with a sub-task that is identified or defined by the status the persistent flag.

According to a further example the NFC controller is configured to switch the persistent flag from the deactivated state into the activated state after completion of the second sub-task. Here, the second sub-task may be a final sub-task of the overall logical operation. If the persistent flag is activated the NFC controller may continue with a further operation, such as a data exchange with the wireless communication device. Naturally, the NFC controller and the logical operation are not limited to the splitting into only a first and a second sub-task and to a activation of only one persistent flag.

Generally, the passive NFC device and the respective method of performing the logical operation can be divided into a number of sub-tasks, e.g. 1, 2, 3, . . . , n sub-tasks, with n being an integer number. Depending on the number of sub-tasks the overall logical operation can be divided into, the passive NFC device comprises a respective number of 1, 2, 3, . . . , n persistent flags. It can be noticed that coding of the persistent flags can reduce the number of required flags with respect to the number of sub-tasks, without changing the subject matter of the invention According to another example the NFC controller is configured to switch the at least one persistent flag from the activated state into the deactivated state after completion of the second sub-task. After completion of the second sub-task the overall logical operation may be completed and the NFC controller may perform a further task, e.g. a communication with the wireless communication device. Switching of at least on persistent flag from the activated state into the deactivated state after a completion of the second sub-task represents a return of the NFC controller into an initial configuration, e.g. an idle configuration, and to prepare the NFC controller for a subsequent polling scheme with a wireless communication device.

In a further example the NFC controller is configured to switch the second persistent flag from the deactivated state into the activated state in response to a switching of the at least one persistent flag from the activated state into the deactivated state. Hence, during the logical operation is performed and while the NFC controller is performing numerous sub-tasks one after the other, the respective persistent flags assigned with these sub-tasks are switched concurrently. In effect, the configuration of activated and deactivated persistent flags always represents one particular sub-task of the number of sub-tasks of the logical operation that is currently performed or that should be performed upon a power up of the passive NFC device.

According to another example at least one flag is implemented as a so-called persistent flag configured to maintain the activated state for at least a predetermined persistent flag persistent time. The at least one persistent flag can be implemented as rather persistent memory units that are of volatile type but provide maintenance of the activated state for at least a predetermined persistent flag persistent time. For instance, a persistent flag can comprise at least one capacitor or may be physically implemented as a capacitor configured to maintain the activated state for at least a few hundred milliseconds or even seconds. Typically, the flag persistent time is longer than a polling interval of the wireless communication device configured to communicate with the passive NFC device. Typically, the flag persistent time is larger than two times, larger than five times or even larger than ten times of the polling interval of the wireless communication device.

In a further example the passive NFC device also comprises a non-volatile memory comprising at least one memory block. Typically, the first sub-task comprises at least erasing of the at least one memory block. The second sub-task comprises at least writing of the at least one memory block. The erasing and the writing of the at least one memory block is performed one after the other. Writing of the at least one memory block can only be performed after the respective memory block has been erased during performance of the first sub-task.

In a further example the NFC controller is configured to communicate with a wireless communication device on the basis of a first communication protocol. Typically, the first communication protocol defines a first state of timeout. The state of timeout specifies how long the wireless communication device accepts responses after a polling request transmitted to the passive NFC device and hence to the controller. The wireless communication device is further configured to communicate with near field communication devices on the basis of the first communication protocol and on the basis of a second communication protocol defining a second state of timeout. The first and the second states of timeout are different.

Typically, the second state of timeout is larger than the first state of timeout. Insofar, the second state of timeout of the second communication protocol used by the wireless communication device is larger than the first state of timeout of the first communication protocol. Typically, the wireless communication device is configured to alternately conduct polling requests to passive NFC devices, wherein polling requests based on the first communication protocol and polling requests based on the second communication protocol alternate. In a typical example the wireless communication device is configured to conduct a polling request based on the first communication protocol followed by a polling request based on the second communication protocol. Thereafter, the wireless communication device is configured to conduct a polling request that is again based on the first communication protocol and so on.

In a further example the NFC controller of the passive NFC device is configured to establish a data communication with the wireless communication device that is based on the first communication protocol. However, the logical operation that may be, e.g. required to set up and/or to initialize a communication link between the passive NFC device and the wireless communication device, may be triggered by a polling request of the wireless communication device based on the second communication protocol. For instance, the second state of timeout of the second communication protocol may be large enough to provide sufficient time for the NFC controller to perform the logical operation and/or to subsequently perform the at least first and second sub-tasks. If the logical operation should be interrupted after completion of the first sub-task, e.g. during loss of power, the at least on persistent flag has been activated. When resuming the logical operation, e.g. during a subsequent polling request, the logical operation is resumed directly with conducting of the at least second sub-task.

According to a further example the first state of timeout is shorter than a total operation time required by the NFC controller to perform the logical operation. Hence, during a first polling request based on the first communication protocol and based on the first state of timeout the time provided by the first communication protocol is too short for the NFC controller to perform and to complete the logical operation.

The NFC controller may start to perform the logical operation and is at least able to perform and to complete the first sub-task and to activate the at least on persistent flag. With a subsequent polling request that is based on one of the first or second communication protocols the NFC controller directly resumes the logical operation by skipping the first sub-task and directly performing the second sub-task. During this subsequent polling request the overall logical operation may be completed or, if the time allotted by the second polling request is still too small to complete the overall logical operation the logical operation may be completed during a subsequent third or fourth polling request.

The dividing of the logical operation into numerous sub-tasks provides a rather flexible and practical approach to conduct and to perform the logical operation during a series of sequential sub-tasks, each of which can be triggered by a polling request based on at least one of the first and second communication protocols of the wireless communication device.

According to a further example the NFC controller is configured to ascertain if the wireless communication device is polling for near field communication devices configured to communicate on the basis of the first communication protocol or on the basis of the second communication protocol. Here, the NFC controller is further configured to perform the logical operation only when the NFC controller has ascertained that the wireless communication device is polling for near field communication devices configured to communicate on the basis of the second communication protocol. Even though the passive NFC device is configured to communicate with the wireless communication device on the basis of the first communication protocol only the performance of the logical operation may be exclusively triggered by a polling request based on the second communication protocol, wherein the second state of timeout of the second communication protocol is larger than a first state of timeout of the first communication protocol. In this way it is ensured, that the time allotted by the second state of timeout is large enough to perform the logical operation and to complete the logical operation.

In other examples the time provided or defined by the second state of timeout may be shorter than the total time required for the NFC controller to perform the overall logical operation. In this case the logical operation, in particular the numerous sub-tasks thereof are performed and executed by or during subsequent polling requests of the wireless communication device, wherein subsequent polling requests are based on one of the first communication protocol and the second communication protocol.

In this way, also rather complicated and time consuming logical operations can be executed by the NFC controller even if the time allotted by any one of the first or second communication protocols should be shorter than the time required for conducting the overall logical operation.

In a further aspect the disclosure also relates to a near field communication system implementing this method, that system comprising:

at least one passive near field communication device, and a wireless communication device configured to communicate with the at least one passive near field communication device.

Advantageously, in this system the near field communication controller of the passive NFC device is configured to communicate with the wireless communication device on the basis of a first communication protocol defining a first state of timeout, wherein the wireless communication device is configured to communicate with the at least one passive near field communication device on the basis of the first communication protocol and on the basis of a second communication protocol defining a second state of timeout, wherein the second state of timeout is larger than the first state of timeout.

Also, advantageously, in this system, that near field communication controller is configured to ascertain if the wireless communication device is polling for the at least one passive near field communication device configured to communicate on the basis of a first communication protocol or on the basis of a second communication protocol and wherein the near field communication controller is configured to perform the logical operation only when the near field communication controller has ascertained that the wireless communication device is polling for passive near field communication device configured to communicate on the basis of the second communication protocol.

In this system, the wireless communication device that is configured to communicate with the at least one near field communication device on the basis of a first communication protocol. Typically, the wireless communication device is or comprises a mobile electronic device. The wireless communication device may comprise one of a smartphone, a smart watch, a tablet computer, or some other kind of wearable electronic device. Typically, the wireless communication device is further configured to communicate with the internet and to set up a communication link between the passive NFC device and the internet.

In a further example the wireless communication device is not only configured to communicate with the passive NFC device on the basis of a first communication protocol. The wireless communication device is also configured to communicate with passive NFC devices on the basis of at least a second communication protocol. The first or second communication protocols are characterized by first and second polling requests each of which being characterized by a first and a second state of timeout, respectively. Typically, the second state of timeout of the second polling request based on the second communication protocol is larger than a first state of timeout of a first polling request of a first communication protocol.

The near field communication device is configured to communicate and to interact with the passive NFC device as described above. Any features, benefits and effects as described above in connection with the passive NFC device equally apply to the wireless communication device and to the NFC system; and vice versa.

BRIEF DESCRIPTION OF THE DRAWINGS

In the following examples of the passive NFC device, of the NFC system and of methods of establishing communication between the passive NFC device and the wireless communication device are described in more detail by making reference to the drawings in which.

DETAILED DESCRIPTION

Figure 1:
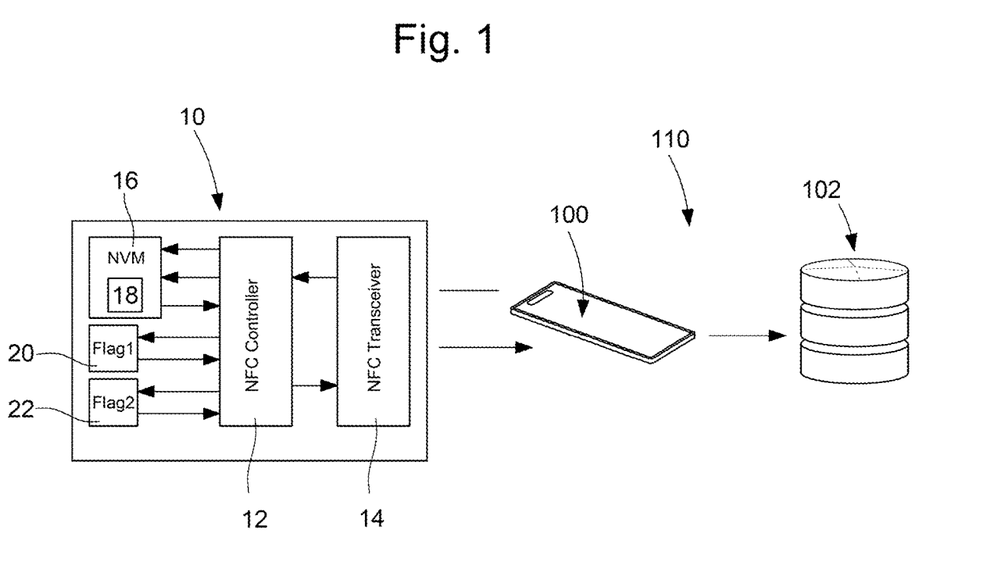
FIG. 1 schematically shows an NFC system comprising at least one passive NFC device and a wireless communication device, according to the embodiment of the invention.

In FIG. 1, a near field communication system 110 is schematically illustrated. The NFC system 110 comprises at least one passive NFC device 10 and at least one wireless communication device 100. The wireless communication device 100 may comprise a mobile electronic device, such as a smartphone, a smart watch, a tablet computer or some other type of a wearable electronic device. The wireless communication device 100 may further comprise a personal computer or an immobile computing device providing connection to the internet, in particular to a web server 102.

The passive NFC device 10 may comprise a passive NFC tag. The passive NFC device comprises at least an NFC controller 12, an NFC transceiver 14 connected to the NFC controller 12. By means of the NFC transceiver 14 the passive NFC device is enabled to set up a communication link with the wireless communication device 100. Through the NFC transceiver 14 the passive NFC device 10 becomes enabled to communicate with the wireless communication device 100.

The passive NFC device 10 further comprises a non-volatile memory 16 with at least one memory block 18. The passive NFC device 10 further comprises at least one persistent flag 20, 22.

It must be understood that the invention can easily be implemented by using only one persistent flag. However for a better understanding, the implementation of the different aspects of the invention such as the method and system of establishing communication between a wireless communication device 100 and a passive near field communication device, is here described by using two persistent flags or at least two persistent flags: a first persistent flag 20 and a second persistent flag 22.

This passive NFC device 10 further comprises at least a first persistent flag 20 and at least a second persistent flag 22. The NFC controller 12 is configured to activate and to deactivate any one of the two persistent flags 20, 22. Insofar, the NFC controller 12 is configured to set or to reset any one of the flags 20, 22. The NFC controller 12 is further configured to read a value at least temporarily stored in each one of the first and the second persistent flags 20, 22, respectively.

The NFC controller 12 is further configured to read the at least one memory block 18 of the non-volatile memory 16. The NFC controller 12 is further configured to write and/or to erase the memory block 18 and hence at least a portion or the entire non-volatile memory 16.

As we will see later, in this NFC system, the near field communication controller 12 is configured to communicate with the wireless communication device 100 on the basis of a first communication protocol defining a first timeout, wherein the wireless communication device 100 is configured to communicate with the at least one passive near field communication device on the basis of the first communication protocol and on the basis of a second communication protocol defining a second timeout, wherein the second timeout is larger than the first timeout. Furthermore, the near field communication controller 12 is configured to ascertain if the wireless communication device 100 is polling for the at least one passive near field communication device configured to communicate on the basis of a first communication protocol or on the basis of a second communication protocol and wherein the near field communication controller 12 is configured to perform the logical operation 200 only when the near field communication controller 12 has ascertained that the wireless communication device 100 is polling for passive near field communication device configured to communicate on the basis of the second communication protocol.

Figure 2:
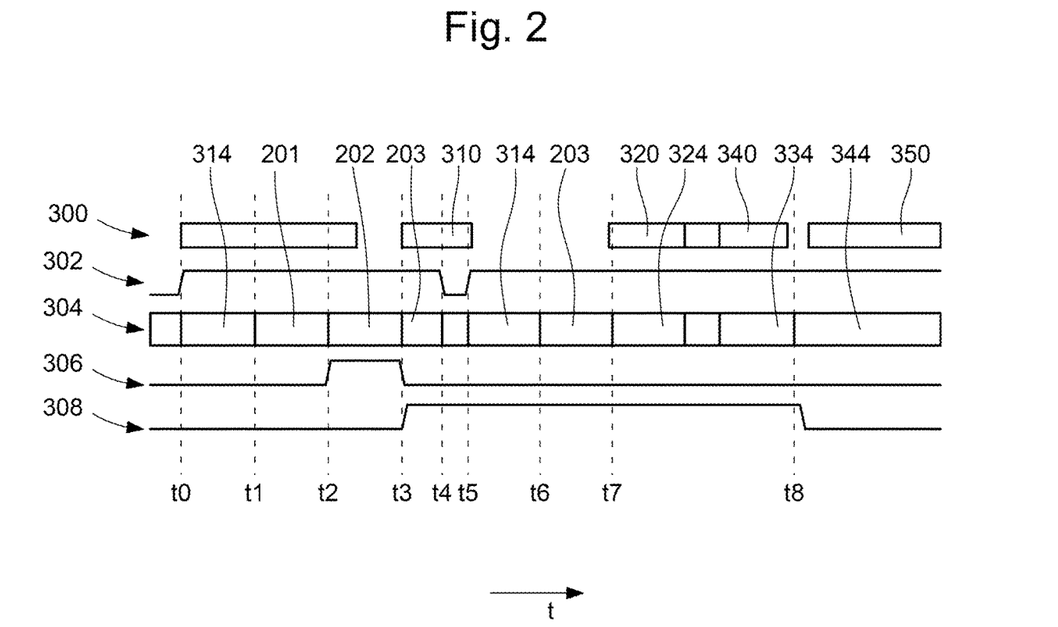
FIG. 2 illustrates a temporal sequence of commands and requests as well as states of persistent flags during subsequent polling requests transmitted by the wireless communication device, according to the embodiment of the invention.

In FIG. 2, the states of numerous components of the wireless communication device 100 and of the passive NFC device 10 are illustrated. In a first row 300 the state of the wireless communication device is illustrated over time. In a second row 302 the electric power received by the passive NFC device from the wireless communication device 100 is illustrated. In the further row 304 the internal states of the passive NFC device are illustrated. In the further row 306 the state of the persistent flag 20 is illustrated over time and in the row 308 the state of the second persistent flag 22 is illustrated over time.

At a time t0 the passive NFC device 10 is arranged in close vicinity to the wireless communication device 100 and the wireless communication device 100 transmits a polling request. Accordingly, the wireless communication device acting as an NFC reader provides electromagnetic energy. The electromagnetic energy is transmitted to the passive NFC device 10 and leads to a power up and to a performance of a boot procedure 314 of the passive NFC device 10. Thereafter and at a time t1 the NFC controller 12 starts to perform a first sub-task 201.

The sub-task 201 comprises or includes e.g. erasing a memory block 18 of the non-volatile memory 16. Thereafter and at a time t2 the first persistent flag 20 is activated. Concurrently and at the time t2 a second sub-task 202 is started. At a subsequent time t2 this second sub-task 202, e.g. including incrementing of a counter and writing the memory block 18 of the non-volatile memory 16 has been completed. Consequently, the first persistent flag 20 is deactivated and is set to zero. Concurrently, the second persistent flag is activated and is hence set to logic 1.

Thereafter, and at time t3 a third sub-task 203 is initiated and started. But before this third sub-task has been completed the wireless communication device 100 transmits a further command 310, e.g. a command that triggers a diminution of available energy in the field that results in the NFC controller 12 being temporally set into a reset state. It is hence deactivated until a time t4. In the time interval between t3 and t4 the NFC controller 12 is simply switched off. As illustrated the first and second persistent flags 20, 22 are of persistent type and maintain their state.

At a time t5 the passive NFC device 10 and hence the NFC controller 12 is rebooted and at time t6 the logical operation that started before at time t1 is resumed directly with a repetition of the third sub-task 203. At the time t7 the third sub-task 203 has completed. The NFC controller 12 and hence the entire passive NFC device 10 is now ready to receive a further inventory command 320 from the wireless communication device 300. The receipt of the inventory command 320 is illustrated as item 324 in FIG. 2. In response to receive the inventory command 324 the NFC controller 12 is configured to send and to return a message 334, e.g. a NDEF message to the wireless communication device 100. The wireless communication device may request such a message in step 340. Upon receipt of the message 334 the wireless communication device 100 transmits the respective message to the web server 102 in a step 350. Thereafter and after having transmitted the message 334 to the wireless communication device 100 the second persistent flag 22 is deactivated at time t8 and the passive NFC device 10 as well as its NFC controller 12 return into and remain in an idle state 344.

In this way the scheme as illustrated by FIGS. 1 and 2 provides use of one or more power up time periods to autonomously update one or more mirrored values in a non-volatile memory 16 before the passive NFC device 10 is allowed to communicate with the wireless communication device 100, e.g. for the purpose of a web-based authentication. Here, the wireless communication device 100 may use a polling scheme to search for passive NFC devices 10 of various NFC technology types. The passive NFC device 10 supports NFC technology, in particular a communication protocol of a first type to send a dynamic near field data exchange format (NDEF) message that directs the wireless communication device 100 to use its web browser and go to a URL specified by the NDEF message.

The described concept is expanded to perform web-based authentication of the passive NFC device or of an object attached to the passive NFC device. This type of authentication requires use of a dynamic NDEF message using a value that is known to change any predictable manner. For example, it could be the use of a sequence number that is known to increase each time the NDEF message is sent to the wireless communication device. Here, the sequence value must be updated after the passive NFC device power up and prior to the establishing of a communication link between the passive NFC device 10 and the wireless communication device 100.

By dividing a rather complex logical operation into numerous sub-tasks enables use of one or more power up sequences to perform autonomously each of the different sub-tasks. During this one or more power up sequences and until the overall logical operation has been completed the passive NFC device 10 is typically prevented from communicating with the wireless communication device 100. The completion of each sub-task is validated by the use of one or more flags 20, 22. Typically, the flags 20, 22 are configured as persistent flags to maintain the operation state over a time when the passive NFC device is not powered. The numerous power up sequences require to perform the numerous sub-tasks can be of the same NFC technology type or of different NFC technology types, such as different communication protocols.

In the case of a web authentication, the steps and the sub-tasks to be conducted comprise updating one or more mirrored values in the non-volatile memory 16, then performing a cryptographic operation before the passive NFC device 10 is allowed to communicate with the wireless communication device 100. Each memory update can be further decomposed in non-volatile memory erase and non-volatile memory write operations. The status of the autonomous update is checked by using the non-volatile memory read margin test and one or more of the persistent flags 20, 22.

The wireless communication device 100 may use a polling scheme to search for passive NFC devices 10 of different NFC technology types. Assuming a passive NFC device supporting a first NFC communication protocol, e.g. the type 5 ISO/IEC 15693 protocol to send a dynamic NDEF message to the wireless communication device 100 and the protocol used by this particular NFC technology does not provide sufficient time for the autonomous non-volatile memory write operation. Further assuming that the wireless communication device 100 uses a polling scheme that searches for passive NFC devices 10 of the first NFC technology in addition to passive NFC devices supporting NFC technology of a second type, e.g. supporting the NFC forum type 2 communication protocol using the ISO/IEC 1443 communication protocol. This second type or this second protocol does in fact provide sufficient time for an autonomous non-volatile memory write operation.

Now, the passive NFC device 10, in particular its NFC controller 12 is configured to make use of the field on time when the wireless communication device 100 is polling for passive NFC devices configured to communicate on the basis of the second type of NFC protocol to perform the autonomous update of a value in non-volatile memory for an passive NFC device 10 configured to operate on the basis of the first NFC protocol. The passive NFC device 10 based on the first NFC communication protocol will not communicate with the wireless communication device 100 until after the autonomous update has been completed.

Figure 3:
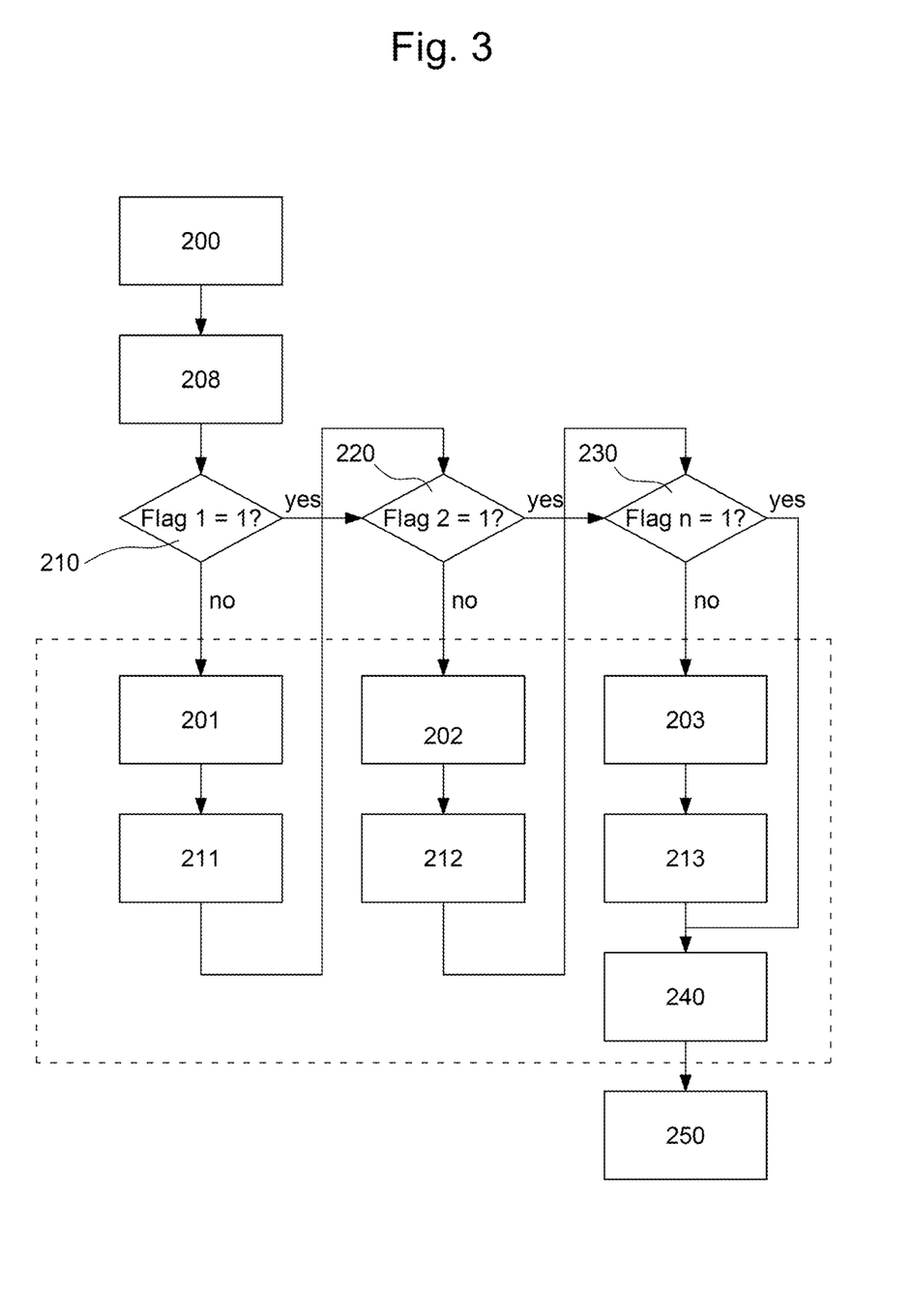
FIG. 3 is representative of a flow chart showing the dividing and splitting of a logical operation into a sequence of numerous sub-tasks, according to the embodiment of the invention.

As further illustrated in FIG. 3, the complex logical operation 200 to perform the autonomous update is decomposed in numerous sub-tasks 201, 202, 203. Here, the sub-task 203 represents an $n_{th}$ sub-task of a sequence of 1, ..., n sub-tasks, with n being an integer number, into which the overall logical operation 200 has been divided. Typically, each of the sub-tasks 201, 202, 203 has a lasting effect on the non-volatile memory 16. After each sub-task 201, 202, 203 a flag status of a persistent flag is mapped to or assigned to each of the sub-tasks to code and/or to indicate the momentary operation status.

Here, in step 211 and after completion of step 201 a first persistent flag 20 is activated. Activation of the first persistent flag 20 in step 211 indicates that the first sub-task 201 has been completed. In the event, that power is lost before the next step 220 has been executed the scheme would start again from step 206. Thereafter, the passive NFC device 10 and the NFC controller 12 are initialized in step 208. In the subsequent step 210 the status of the first persistent flag 200 is ascertained. If the persistent flag 20 has been activated before the method continues directly with step 220. Consequently, the first sub-task 201 is skipped. The method and the NFC controller 12 directly continue with the second sub-task 202.

Thereafter and in step 212 the second persistent flag 22 is activated and the method will continue with step 230. There, it is checked if an $n_{th}$ persistent flag has been activated. If the respective persistent flag has not yet been activated this is an indication that the respective $n_{th}$ sub-task 203 still has to be performed. In the subsequent step 203 the $n_{th}$ sub-task is executed and the respective $n_{th}$ persistent flag 230 is activated. In a final step 240 the logical operation 200 is finalized and completed and thereafter in step 250 the normal operation of the passive NFC devices 10, e.g. communication and transmission of an NDEF message to the wireless communication device 100 is conducted. Thereafter but not illustrated all persistent flags 20, 22 may be reset.

If for instance power should be lost between steps 213 and 240 the $n_{th}$ persistent flag has been set appropriately. Upon a repeated power up in step 206 the method continues with the initialization in step 208. Thereafter, in step 210 the activated first persistent flag is ascertained. The method then continues with step 220 checking the state of the second persistent flag. Since the second persistent flag is also still active the method will continue with step 230. Ascertaining that the $n_{th}$ persistent flag is also activated or asserted the method will directly continue with step 240. Hence, the operations and the steps 203, 213 will be skipped. As we already explained before, the coding on the persistent flags can be modified without changing the method for recovering the last state of execution.

Figure 4:
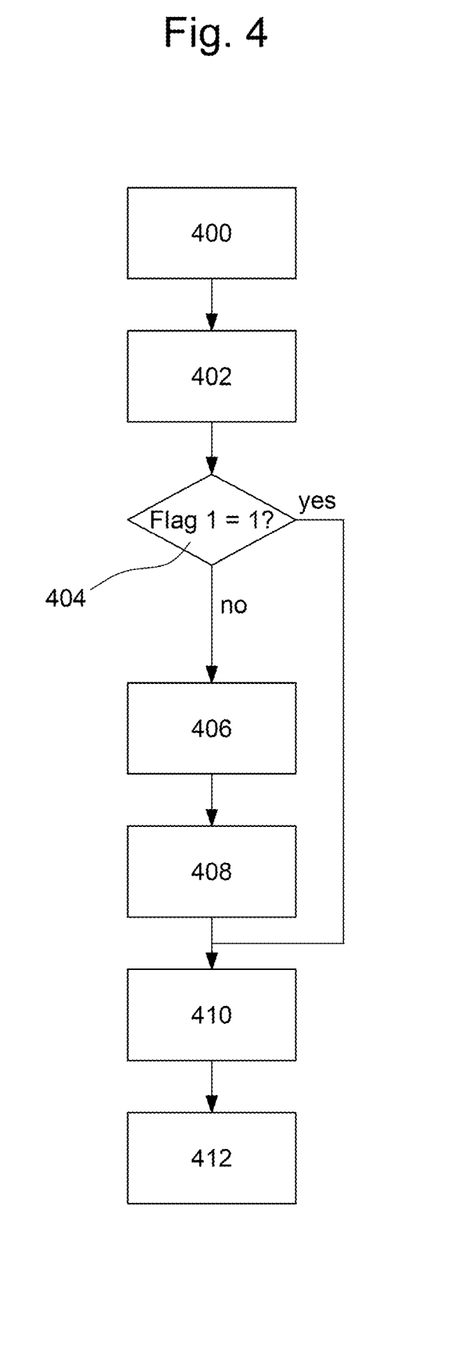
FIG. 4 is illustrative of a further flow chart, wherein a rather complex logical operation is decomposed into a number of sub-tasks.

FIG. 4 describes a particular implementation of the principle described before with regard to FIG. 3 using only one persistent flag implementation for web authentication. In a first step 400 the passive NFC device 10 is powered up. In the subsequent step 402 the passive NFC device 10 and the NFC controller 12 are initialized. Thereafter it is checked in step 404 if the first persistent flag 20 has been activated before. If the persistent flag has been activated the method directly jumps to step 410 in which a cryptographic computation is performed. After completion of step 410 and when the complex logical operation 200 has been completed the method may continue with a normal operation of the passive NFC device 10 in step 412.

If in step 404 the first persistent flag 20 has not yet been activated the method continues with step 406 as a first sub-task. In step 406 and as a first sub-task non-volatile memory, e.g. a memory block 18 of the non-volatile memory 16 is erased and a sequence counter is updated in the memory. Thereafter and in order to indicate that this first step or this first sub-task has been actually performed and completed the first persistent flag is activated in step 408.

Figure 5:
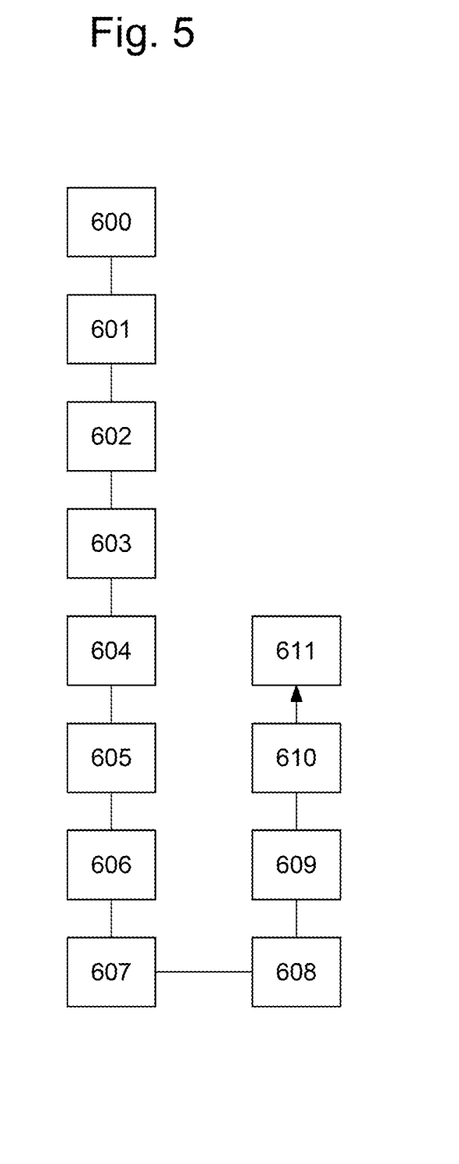
FIG. 5 is a logic diagram relating to a method of establishing communication between a wireless communication device and a passive near field communication device, according to the embodiment of the invention.

The system is capable of implementing a method of establishing communication between the wireless communication device 100 and the passive near field communication device 10. As we already mentioned, this passive near field communication device 10 comprises the near field communication controller 12, the near field communication transceiver 14 coupled with the near field communication controller 12, the first persistent flag 20 coupled with the near field communication controller 12, the first persistent flag 20 being switchable between an activated state and a deactivated state, the second persistent flag 22 coupled with the near field communication control 12, the second persistent flag 22 being switchable between an activated state and a deactivated state.

In this method represented in FIG. 5, the communication between the wireless communication device 100 and the passive near field communication device 10 is realized:

on the basis of a first communication protocol defining a first state of timeout, or on the basis of a first communication protocol and on the basis of a second communication protocol defining a second state of timeout, wherein the second state of timeout is larger than the first state of timeout.

In this context, the first state of timeout is shorter than a total operation time required by the near field communication controller 12 to perform the logical operation 200.

The method comprises a step of transmitting 600 at least one polling request from the wireless communication device 100 to the passive near field communication device 10 the at least one polling request being relative to a logical operation to complete by the near field communication controller 12.

Thereafter, this method comprises a step of performing 601 the logical operation by the near field communication controller 12 in function of the activated or deactivated state of the first or the second persistent flag during a state of timeout of the passive wireless communication device 100 succeeding to each polling request. This step 601 includes a sub-step of determining/ascertaining 602 if the wireless communication device 100 is polling for the passive near field communication device 10 configured to communicate on the basis of a first communication protocol or on the basis of a second communication protocol.

Then, this step of performing 601 comprises a sub-step of splitting 603 the logical operation 200 into a sequence of at least a first subtask 201 and a second subtask 202. Such a step of performing 601 is realized only when the near field communication controller 12 has ascertained that the wireless communication device 100 is polling for the passive near field communication device configured to communicate on the basis of a first communication protocol or on the basis of a second communication protocol.

Thereafter, this step 601 includes a sub-step of selectively performing 604 by the near field communication controller 12 at least one of the first subtask 201 and the second subtask 202 on the basis of the status of at least one of the first persistent flag 20 and the second persistent flag 22. This sub-step 604 comprises these following phases:
- a identifying/ascertaining phase 605 by the near field communication controller 12, the status of the first persistent flag 20 and the status of the second persistent flag 22;
- a performing phase 606 of the first subtask 201 when the first persistent flag 20 is deactivated;
- a switching phase 607 of the first persistent flag 20 from the deactivated state into the activated state after completion of the first subtask 201;
- a performing phase 608 of the second subtask 202 when the first persistent flag 20 is activated;
- a switching phase 609 of the second persistent flag 22 from the deactivated state into the activated state after completion of the second subtask 202;
- a switching phase 610 of the first persistent flag 20 from the activated state into the deactivated state after completion of the second subtask 202; and
- a switching phase 610 of the second persistent flag 22 from the deactivated state into the activated state in response to switching the first persistent flag 20 from the activated state into the deactivated state.

It is important to note that at least one of the first and the second persistent flags is implemented as a persistent flag configured to maintain the activated state for at least a predetermined flag time.

Figure 6:
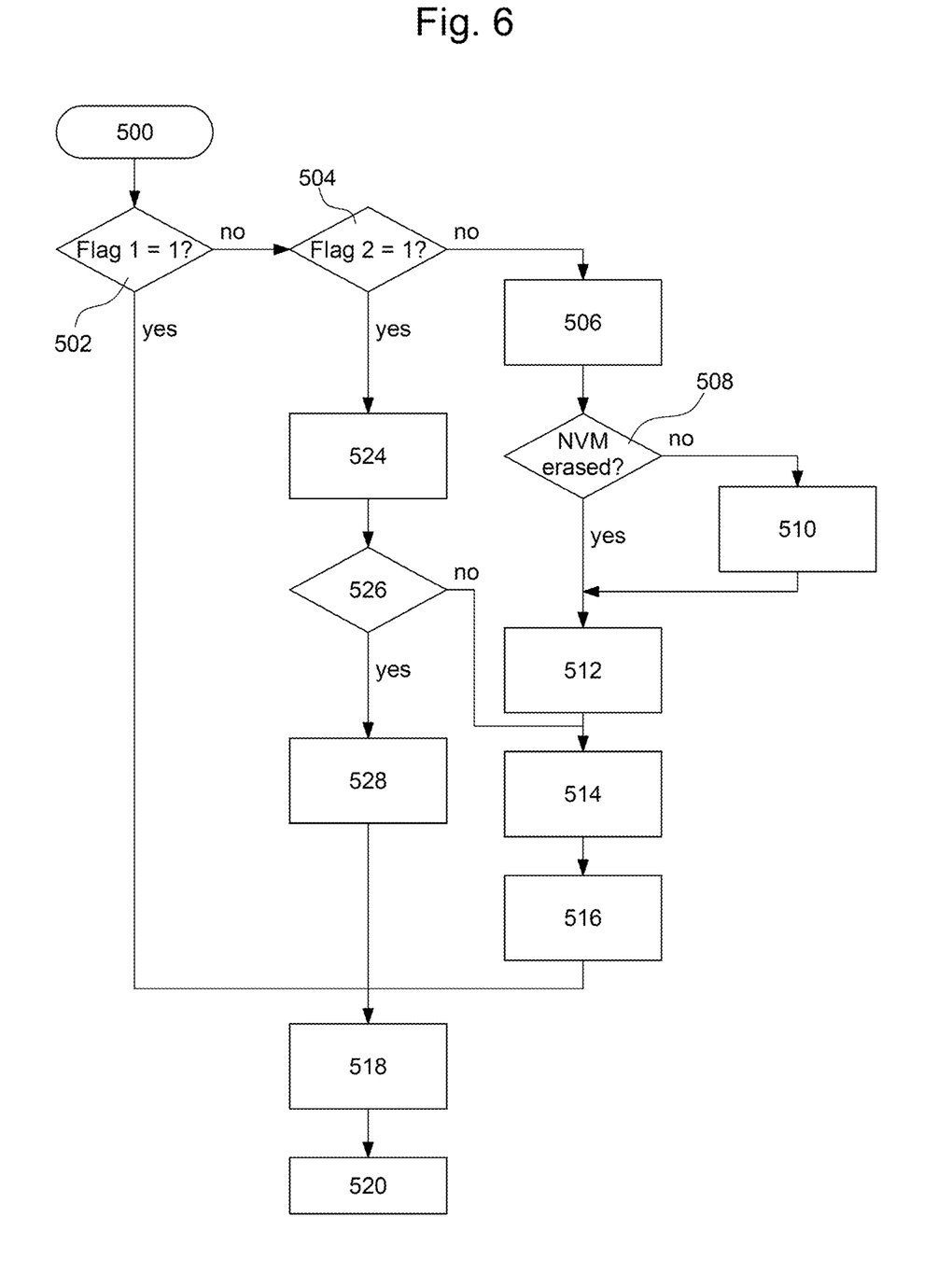
FIG. 6 illustrates a further flow chart of the method of establishing communication between the wireless communication device, wherein the logical operation is divided into a first and a second sub-task and wherein a first and a second persistent flag are used, according to the embodiment of the invention.

Finally in FIG. 6, a particular implementation of the above described principle is described by using two persistent flags 20, 22 for web authentication and using two different types of NFC technologies or NFC communication protocols. When the passive NFC device becomes energized due to the field from the wireless communication device 100 it must sense during power up whether the wireless communication device 100 is polling for passive NFC devices operating on the basis of a first communication protocol or operating on the basis of a second communication protocol. If the wireless communication device 100 is polling for passive NFC devices operating on the basis of the second NFC communication protocol then the passive NFC device 10 will start the autonomous update of the value in its non-volatile memory 16.

After the power up 500 in a proceeding step 502 it is first checked if the second persistent flag 22 has been activated before. If the second persistent flag 22 has not been activated before the method continues with step 504. In step 504 it is checked if the first persistent flag 20 has been activated before. If the first persistent flag 20 is in the deactivated state the method continues with step 506. In this step the non-volatile memory is read with margin to see if it has been fully erased. If it is ascertained in the subsequent step 508 that the non-volatile memory has been fully erased then the first persistent flag 20 is activated in step 512. In the other case and if step 508 reveals that the non-volatile memory has not been fully erased then in the intermediate step 510 the non-volatile memory is erased. After completion of the erase operation the method continues with step 512.

Thereafter and in step 514 the new value is written in the non-volatile memory. In step 516 the first persistent flag 20 is deactivated and the second persistent flag 22 is activated. Finally and in step 518 the passive NFC device 10 and hence the NFC controller 12 continues with a normal operation. For instance, the NDEF message is transmitted to the wireless communication device 100. In a further step 520 the second persistent flag 22 is deactivated.

Assuming that the power supply for the passive NFC device 10 is interrupted during the subsequent performance of the steps 500-520 the procedure always starts again with the power up in step 500. If in step 502 it is ascertained that the second persistent flag 22 is activated the method directly continues with the normal operation of the passive NFC device in step 518.

In the other case and if the write operation in the memory has not been completed and hence if the second persistent flag has not yet been activated in step 516 the method continues from step 502 with step 504. If in step 504 it is ascertained that the first persistent flag 20 has been activated in a previous step 512 the method continues with step 524. There, the non-volatile memory is read with margin to see if it has been fully written with the correct value. In the next step 526 it is checked if the non-volatile memory has been fully written. If fully written the method continues with step 528. There, the first persistent flag 20 is deactivated and the second persistent flag 22 is concurrently activated before the method continues with step 518 with the normal operation. If it is ascertained in step 526 that the non-volatile memory has not been fully written then the method continues with step 514.

LIST OF REFERENCE NUMERALS

10 NFC device
12 NFC controller
14 NFC interface
16 non-volatile memory
18 memory block
20, Flag 1 persistent flag 1
22, Flag 2 persistent flag 2

100 wireless communication device
102 web server
110 near field communication system

The invention claimed is:

1. A method of establishing communication between a wireless communication device and a passive near field communication device, wherein the passive near field communication device comprises a near field communication controller, a near field communication transceiver coupled with the near field communication controller, and at least one persistent flag coupled with the near field communication controller, the persistent flag being switchable between an activated state and a deactivated state, comprising:
   transmitting at least one polling request from the wireless communication device to the passive near field communication device, the at least one polling request being related to a logical operation comprising a sequence of a first subtask and at least one subsequent subtask to be completed by the near field communication controller, and
   performing the logical operation beginning with the first subtask by the near field communication controller when the at least one persistent flag is in a deactivated state and performing the logical operation beginning with one of the subsequent subtasks by the near field controller when the at least one persistent flag is in an activated state, during a state of timeout of the passive wireless communication device succeeding each polling request.

2. The method according to claim 1, wherein the step of performing comprises a sub-step of splitting the logical operation into a sequence of the first subtask and a second subtask.

3. The method according to claim 1, wherein the step of performing comprises a sub-step of ascertaining if the wireless communication device is polling for the passive near field communication device configured to communicate on a basis of a first communication protocol and on a basis of a second communication protocol.

4. The method according to claim 1, comprising ascertaining, by the near field communication controller, of a status of the at least one persistent flag.

5. The method according to claim 1, comprising switching the at least one persistent flag from the deactivated state into the activated state after completion of the first subtask.

6. The method according to claim 1, switching the at least one persistent flag from the activated state into the deactivated state after completion of the at least one subsequent subtask.

7. The method according to claim 1, wherein the at least one persistent flag is implemented as a persistent flag configured to maintain the activated state for at least a predetermined flag time.

8. The method according to claim 1, wherein the communication between the wireless communication device and the passive near field communication device is realized:
   on a basis of a first communication protocol defining a first timeout, and
   on a basis of the first communication protocol and on the basis of a second communication protocol defining a second timeout, wherein the second timeout is longer than the first timeout.

9. The method according claim 8, wherein the first timeout is shorter than a total operation time required by the near field communication controller to perform the logical operation.

10. A passive near field communication (NFC) device comprising:
    a near field communication controller,
    a near field communication transceiver coupled with the near field communication controller, and
    a persistent flag coupled with the near field communication controller, the persistent flag being switchable between an activated state and a deactivated state,
    wherein the near field communication controller is configured to
    receive at least one polling request being related to a logical operation comprising a sequence of a first subtask and at least one subsequent subtask to be completed by the near field communication controller, and
    perform the logical operation beginning with the first subtask when the at least one persistent flag is in a deactivated state and performing the logical operation beginning with one of the subsequent subtasks when the at least one persistent flag is in an activated state.

11. A passive near field communication (NFC) device according to claim 10, comprising a non-volatile memory comprising at least one memory block, wherein
    the first subtask comprises erasing of at least one memory block and wherein the at least one subsequent subtask comprises writing of at least one memory block.

12. A near field communication (NFC) system implementing the method according to claim 1, the system comprising:
    at least one passive near field communication device according to claim 10, and
    a wireless communication device configured to communicate with the at least one passive near field communication device.

13. The system according to claim 12, wherein the near field communication controller is configured to communicate with the wireless communication device on a basis of a first communication protocol defining a first state of timeout, and wherein the wireless communication device is configured to communicate with the at least one passive near field communication device on a basis of the first communication protocol and on a basis of a second communication protocol defining a second state of timeout, wherein the second state of timeout is longer than the first state of timeout.

14. The system according to claim 12, wherein the near field communication controller is configured to ascertain if the wireless communication device is polling for the at least one passive near field communication device configured to communicate on the basis of a first communication protocol and on the basis of a second communication protocol and wherein the near field communication controller is configured to perform the logical operation only when the near field communication controller has ascertained that the wireless communication device is polling for passive near field communication device configured to communicate on the basis of the second communication protocol.

15. The method according to claim 1, wherein the communication between the wireless communication device and the passive near field communication device is realized:
    on a basis of a first communication protocol defining a first timeout,
    on a basis of the first communication protocol and on the basis of a second communication protocol defining a second timeout, the second timeout being longer than the first timeout, and
    the passive near field communication device is configured to perform the logical operation only after ascertainment that the wireless communication device is polling for passive near field communication device configured to communicate on the basis of the second communication protocol.

16. A method of establishing communication between a wireless communication device and a passive near field communication device, wherein the passive near field communication device comprises a near field communication controller, a near field communication transceiver coupled with the near field communication controller, and a plurality of persistent flags coupled with the near field communication controller, the persistent flags being switchable between an activated state and a deactivated state, the method comprising the steps of:

transmitting at least one polling request from the wireless communication device to the passive near field communication device, the at least one polling request being related to a logical operation comprising a sequence of a first subtask and at least one subsequent subtask to be completed by the near field communication controller,     performing the first subtask by the near field communication controller based upon at a and setting a first one of the plurality of persistent flags, and     performing the one subsequent subtask by the near field controller and setting a second one of the plurality of persistent flags.

* * * * *